United States Patent [19]

Lion

[11] 4,447,022

[45] May 8, 1984

[54] REDUCED NOISE MONOLITHIC WING-STABILIZER AIRCRAFT

[76] Inventor: Charles E. Lion, 253 Euclid Ave., Ridgway, Pa. 15853

[21] Appl. No.: 380,558

[22] Filed: May 21, 1982

[51] Int. Cl.³ .......................... B64C 1/00; B64C 5/02; B64C 15/14

[52] U.S. Cl. .................... 244/13; 244/1 N; 244/76 J; 244/45 R

[58] Field of Search ................ 244/1 N, 4 R, 13, 52, 244/55, 76 J, 90 R, 91, 45 R, 36, 15, 58, 53 B; D12/333, 334, 339, 340

[56] References Cited

U.S. PATENT DOCUMENTS

| | | | |
|---|---|---|---|
| D. 138,351 | 7/1944 | Lanier | D12/333 |
| D. 264,838 | 6/1982 | Dornier | D12/340 |
| 2,964,264 | 12/1960 | Multhopp | 244/15 |
| 3,064,419 | 11/1962 | Ward | 244/52 |
| 3,114,520 | 12/1963 | Finrold | 244/52 |
| 3,576,300 | 4/1971 | Palfreyman | 244/1 N |
| 4,203,566 | 5/1980 | Lord | 244/53 B |

Primary Examiner—Sherman D. Basinger
Assistant Examiner—Rodney Corl
Attorney, Agent, or Firm—Virgil P. Quirk

[57] ABSTRACT

A sound reducing combined low mid-wing and horizontal stabilizer airplane with near longitudinal center line thrust twin engines having intensified aileron, elevator and rudder control. Small jet engines rigidly attached to the ailerons intensify attitude control for low speed manuevers.

3 Claims, 9 Drawing Figures

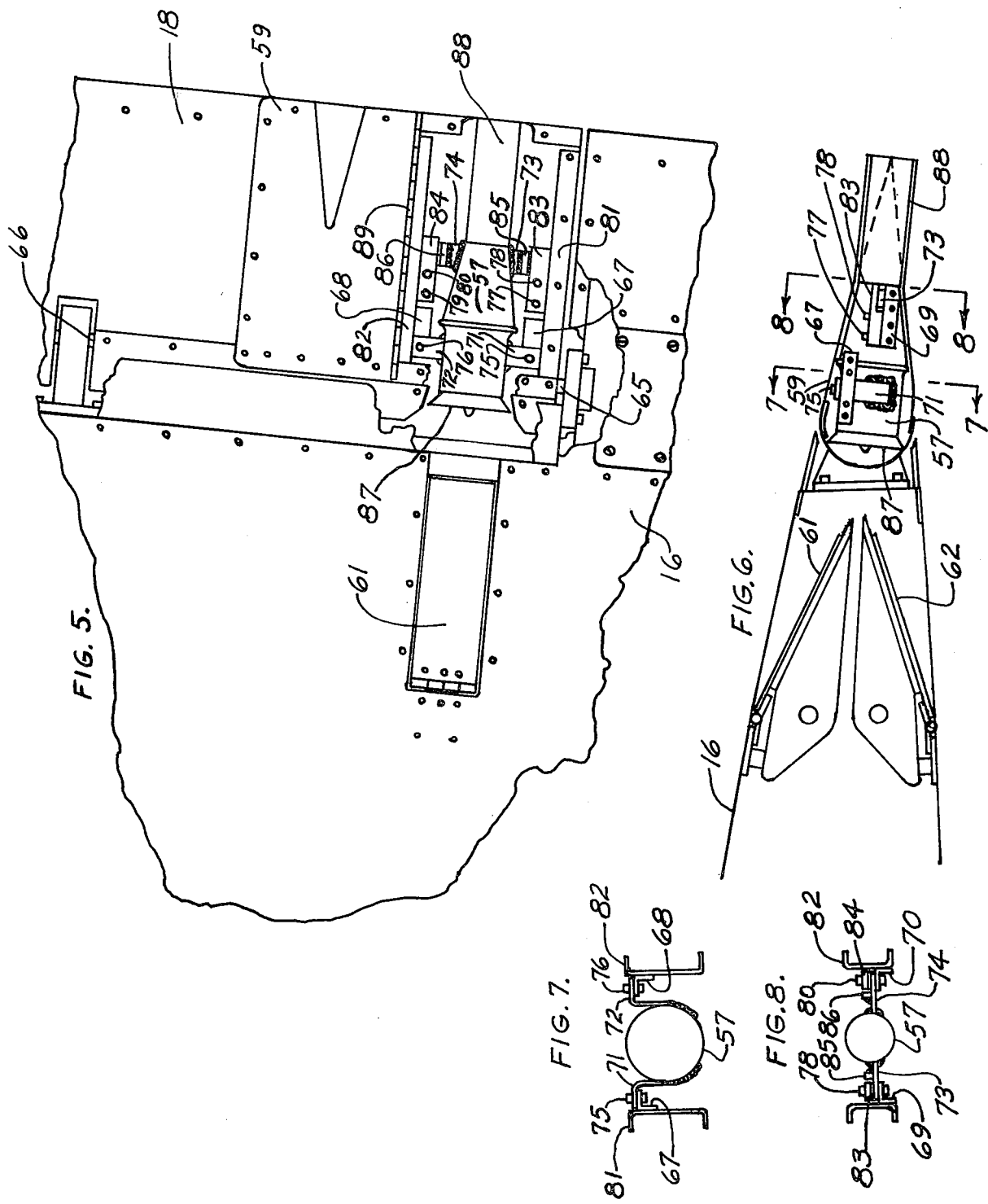

REDUCED NOISE MONOLITHIC WING-STABILIZER AIRCRAFT

BACKGROUND OF INVENTION

This invention relates in general to an arrangement of parts for use in an aircraft capable of intricate low speed manuevering in critical landing and takeoff situations and more particularly to unique structural considerations that direct twin main engine thrusts directly over the control elements of the elevator and rudder. Because of this thrust directed over the monolithic wing-horizontal stabilizer and because the tall vertical stabilizer acts as a separator between the two engines, the air movement from engines must travel above the wing level and just adjacent to each side of the tail vertical stabilizer until it exits the airplane over the elevator and on each side of the rudder. This intensifies control action of both the elevator and the rudder elements.

The engine sound to the ground is reduced because it is contained above the monolithic extension of the wing-horizontal stabilizer and is directed in a controlled manner off of the trailing edges of the vertical and horizontal stabilizer elements.

Further, intensity of attitude control "right and left bank" is attained by using small jet engines attached to each aileron such that aileron movement defines thrust direction of the small engines. The aileron fore-aft centerline is the small engine thrust line.

In the expanding use of commercial and business aircraft, there is a common complaint of vibration, shudder, and element flutter during low speed manuevering such as take-off and landing. This invention substantially advances the state of the art in smooth, sensitive and fine control at reduced speeds, all of which improve air safety at these most critical times. It at the same time does not require a new control skill by the pilot, since jet engine thrust control direction is the same as normal aileron control.

It is therefore the primary object and purpose of this invention to provide an aircraft design which substantially reduces ground noise in take-off, landing and low altitude flight.

Another object of this invention is to substantially improve the manueverability of this aircraft at reduced speeds and low altitudes.

An additional object of the present invention is to provide a sturdy airframe, comprising an inverted "T" tail section blended into the wing and fuselage to reduce tail "shudder" vibrations.

A further object of the above described invention is to allow the pilots, crew, and passengers a clear unobstructed view.

Other, and additional objects and advantages of this invention are to provide a design for an aircraft which will be safe, quiet in the cabin, and cost effective in manufacture and use.

BRIEF DESCRIPTION OF DRAWINGS

FIG. 5 is a cut-away top view of the left wing and aileron showing the small jet engine mounted under the aileron engine access door.

FIG. 6 is a section through the left aileron's outboard end designated 1—1 in FIG. 1 showing a small jet engine rigidly mounted on the aileron.

FIG. 7 is a lateral section through the aileron designated 7—7 in FIG. 6 and cross section of the front small jet engine mount.

FIG. 8 is a lateral section through the aileron marked 8—8 in FIG. 6 and cross section of the rear small jet engine mount.

FIG. 9 is a longitudinal section through the left wing and horizontal stabilizer marked 9—9 in FIG. 1 and elevation view of the left wing, auxiliary outboard stabilizer, slip stream fence looking outward.

DETAILED DESCRIPTION OF ILLUSTRATIVE EMBODIMENTS

Figure 1:
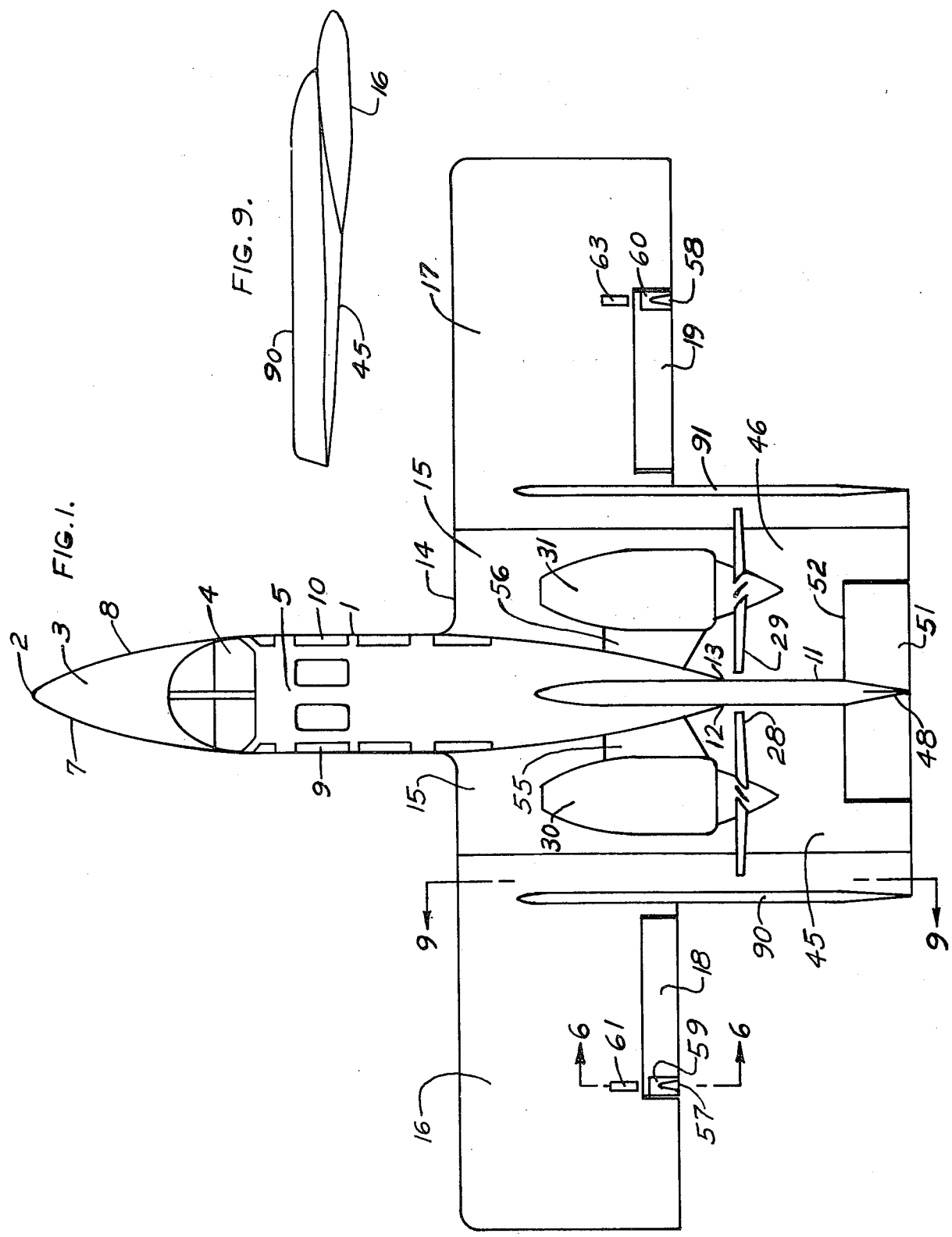
FIG. 1 is a top plan view of a specific embodiment of a passenger aircraft constructed in accordance with this invention.

References are now made to FIG. 1 which show an illustrative aircraft fuselage 1 basically rectangular in shape, having square tipped rectangular wings 16, 17 attached aft-amidship and extending rearward to monolithically intersect the horizontal stabilizers 45, and 46.

FIG. 1 is a top plan view of the aircraft illustrative of the invention, with longitudinal section 9—9 through the left wing and horizontal stabilizer as shown in FIG. 9.

Figure 2:
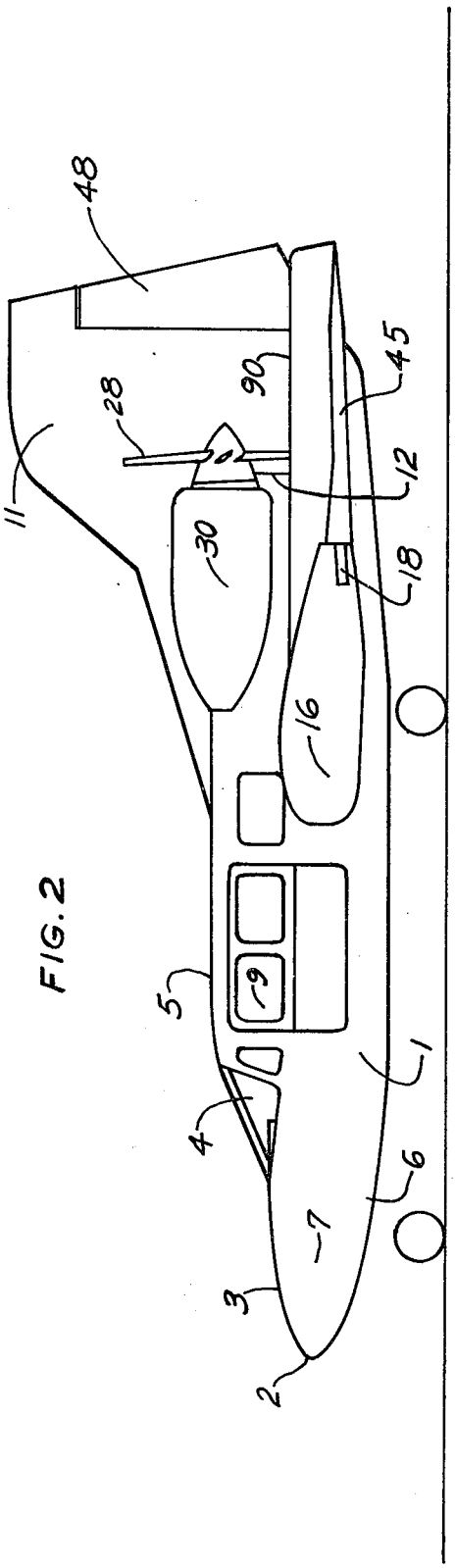
FIG. 2 is a left side elevation view of the aircraft in FIG. 1.

FIG. 2 is a left side elevation view of the aircraft.

Figure 3:
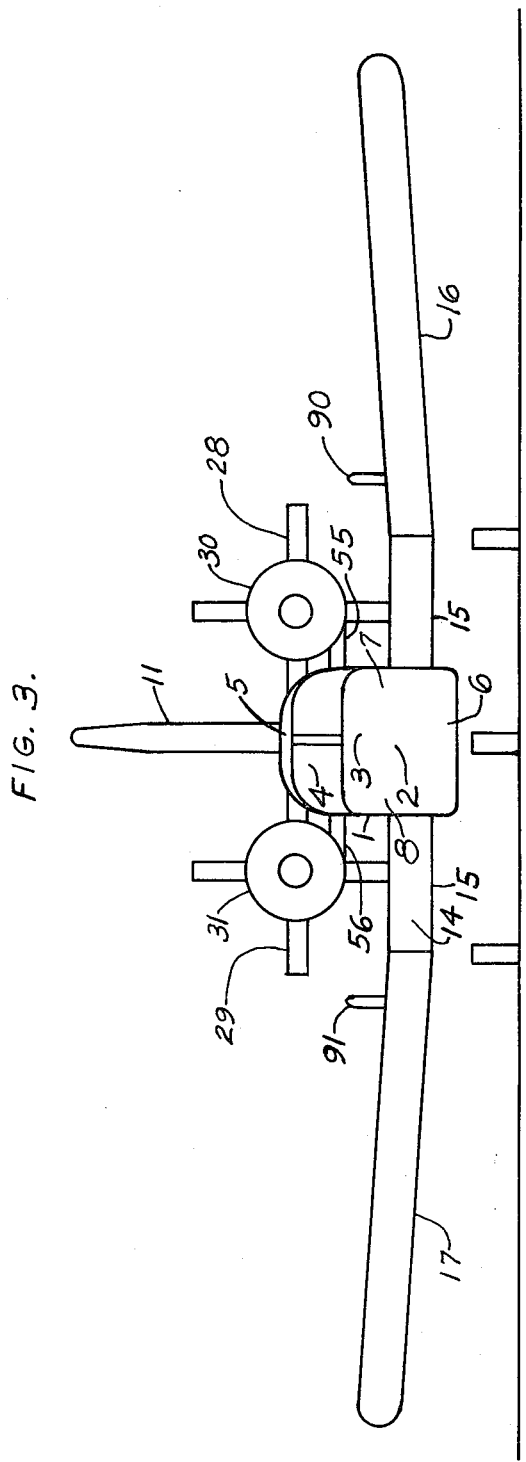
FIG. 3 is a front view of the aircraft in FIG. 1.

FIG. 3 is a front end elevation view of the aircraft.

Figure 4:
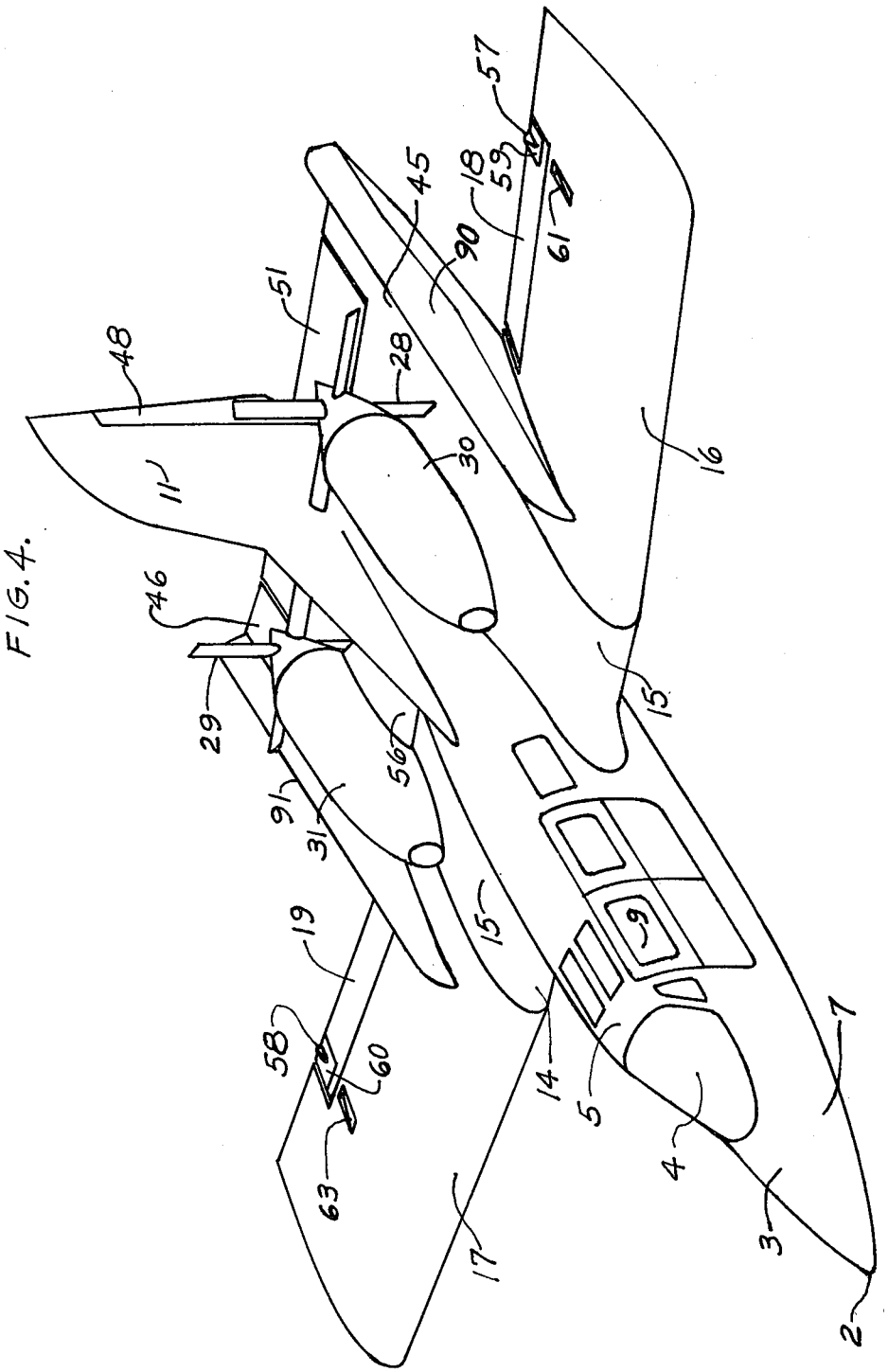
FIG. 4 is a perspective view of the aircraft in FIG. 1.

FIG. 4 is a three quarter left front top perspective view illustrative of the invention.

FIG. 5 is a partial top plan view of the left wing and aileron showing a jet engine under the aileron jet engine access door.

FIG. 6 is a cut-away of the left aileron's outboard end showing a left side elevation of a mounted jet engine centered longitudinally on line 1—1 of FIG. 1 with the remaining portion of FIG. 6 shown in section on line 1—1. Referring to FIG. 1, the fuselage 1 has inward curving sides 7 and 8 and top surface 3 and bottom surface 6 which meet at the front end 2 of the fuselage 1. An inclined windshield 4 is interposed between top side fuselage 7 and side fuselage surface 8. Side windows generally indicated at 9 and 10 are conviently located on side surface 7 and side surface 8 respectively. Side surface 7 and side surface 8 curve inward equally to intersect with the vertical stabilizer 11 at points 12 and 13.

A vertical pivoting rudder 48 attaches to the rear end of the vertical stabilizer 11.

A wing generally indicated at 14 extends from either side of the fuselage 1 at a low mid-wing position. The wing 14 consists of three panels, one center section panel 15, a left hand panel 16 and a right panel 17.

Each wing panel 16 and 17 has a conventional aileron 18 and 19 located at the back end of each wing panel for normal aerodynamic control.

A horizontal stabilizer with panels indicated at 45 and 46 which begin as rearward extensions of the panels 15, 16 and 17 extend outward horizontally from the sides of the aft fuselage 1 and the vertical stabilizer 11 to end at a point of clearance inboard of the aileron 18 and 19.

The stabilizer panels 45 and 46 extend rearward to the stabilizer elevator hinge line 52 which is approximately the same rearward distance as the vertical stabilizer 11 rudder 48 hinge line. Outboard portions of the stabilizer 45 and 46 extend further rearward to end inline with the rudder 48 trailing edge.

The elevator 51 is pivoted at hinge line 52 and extends horizontally spanwise to either side to end at a point of operating clearance inboard of the horizontal stabilizer 45 and 46 outboard extensions. The elevator 51 extends rearward to end at a point on the same line as the trailing edge of the vertical rudder 48.

A pair of engines 30 and 31 are symmetrically located on either side of the aft end of the fuselage 1 above the wing and horizontal stabilizer and are attached to the fuselage 1 with engine mounts 55 and 56, the engines mount pusher propellers 28 and 29 respectively.

The engines 30 and 31 are so positioned as to allow but minimum safe propeller tip clearance between the vertical stabilizer 11 and the horizontal stabilizers 45 and 46, the vertical stabilizer separates the propeller slipstreams thus eliminating air flow interferrance.

For more positive control in low speen flight, there may be added to the conventional aileron control small jet engines 57 and 58 mounted symmetrically on the outboard end of each aileron 18 and 19 in a fixed position with its longitudinal center line of thrust bisecting the aileron hinge pivot center line and bisecting the trailing edge also with its thrust center line.

The small jet engines being mounted to the ailerons in a fixed nonmoving way therefore move with and only when the aileron is moved. Thus, when the aileron is moved to an up-or-down position the thrust of each jet engine 57 and 58 intensifies the control action of each aileron 18 and 19. Jet engine 57 is mounted on the outboard end of aileron 18 and engine 58 is mounted on the outboard end of aileron 19, engine cover doors 59 and 60 enclose jet engines 57 and 58.

Aileron pivot shafts 65 and 66 are shown as part of the left aileron 18 mounting pivots. All pivots are entered in the radius center of the aileron leading edge, and are aligned parallel to the length of the ailerons 18 and 19.

Engine 57 as shown in FIG. 5 and FIG. 6 is mounted inside the aileron 18 by means of support brackets 67, 68, 69, and 70 which support left front engine mount 71, right front engine mount 72, left rear engine mount 73 and right rear engine mount 74, engine mount belts 75, 76, 77, 78, 79, and 80 hold engine 57 in place. Engine support brackets 67 and 69 are riveted to the vertical inside surface of outboard rib 81 and engine support brackets 68 and 70 are riveted to the vertical inside surface of the rib 82. Engine 57 mounts 71, 72, 73, and 74 are attached to engine 57 by welding as shown in FIGS. 5, 6, 7, and 8 and rear engine mount straps 83, and 84 and guides 85 and 86 allow small heat expansion movements of the rear engine mounts 73 and 74 because of allowed working clearances. The front engine mounts 71 and 72, because of their bent design also allow for expansion and shrinking while maintaining a secure anchor.

Air supply to run jet engine 57 enters the jet engine 57 air inlet 87 after passing through air chute doors 61 and 63. Air then passes through air inlet 87 then through the engine during combustion and exhausts through the rear of engine 57 through tail pipe 88.

Engine cover door 59 hinging on piano hinge 89 is closed and held down with dyus fasteners. The engine 57 is now completely enclosed with the exception of the air inlet 86 and the exhaust opening at the back of the tail pipe 88.

Two auxilliary vertical stabilizers with panels indicated at 90 and 91 standing vertically with their front edge set near the leading edge of wing panel 16 and wing panel 17 respectively and extending rearward longitudinally parallel to vertical stabilizer 11 to end with their trailing edge flush with the trailing edge of the horizontal stabilizer 45 and 46.

The two auxiliary vertical stabilizers 90 and 91 serve to further confine the sound of the engines 30 and 31 and the propellers 28 and 29. They also better direct the air flow over the wing while improving longitudinal stability and add to the strength and rigidity of the horizontal stabilizer panels 45 and 46.

The vertical rudder 48 and the elevator 51 also have intensified controlling action due to their close proximity aft in the thrust line of the two pusher propellers 28 and 29. Additionally, the jet engines 57 and 58 mounted in the ailerons 18 and 19 could also be mounted in the elevator 51 and rudder 48 of other aircraft designs in the same manner. Other designs which do not have close by propeller thrust against their control surfaces, these engines being mounted in the rudder and elevator could be mounted in each control surface as deemed necessary. All engines are controlled by the pilot in flight for starting, running, or stopping.

Embodiments of this invention other than the ones illustrated or disclosed or any specific method of operation or use are not intended to be restricted since the same may be modified in various particulars, while residing within the scope and spirit of the claimed invention now hereabove shown and described of which the embodiments are meant only to illustrate and disclose an operative embodiment, without showing all of the various used methods, forms, and modifications that offer potential embodiments of said invention.

I claim:

1. An aircraft comprising: (A) a fuselage having a porpoise shaped nosewindshield extending midlength to a rectangular shape and further in the rear to a transverse vertical lenticular crossection with side walls of said fuselage forming decreasing minor arcuate portions of a cylinder blending into a tall vertical stabilizer fin tail section containing a rudder recessed into the trailing edge of said tall vertical stabilizer and movably attached upstream from the trailing edge of said tall vertical stabilizer; and (B) wings connected to said fuselage containing movably mounted ailerons recessed inboard from tips of said wings, said ailerons extending further inboard to a point of operational clearance adjacent to the intersection of auxiliary vertical stabilizers, said auxiliary vertical stabilizers extending from near the leading edge of said wings parallel to said fuselage, thusly ending flush with said tall vertical stabilizer trailing edge; and (C) a monolithic wing-horizontal stabilizer, said horizontal stabilizer beginning as a rearward extension of said wings, said horizontal stabilizer extending aft of said fuselage and ending flush with an elevator movably mounted into said horizontal stabilizer, said elevator spanning horizontally outward from the intersection with, and on each side of, said tall vertical stabilizer to meet rearward extensions of said horizontal stabilizer and extending rearward to be flush with said horizontal stabilizer trailing edge, and whose leading edge is hinged to the trailing edge of said horizontal stabilizer, said horizontal stabilizer being a rearward continuance of said wings, and extending off said fuselage at wing level outward to end just inboard of said ailerons; and (D) said tall tail vertical stabilizer fin originating on the top centerline of said fuselage extending rearward to be flush with the trailing edge of said horizontal stabilizer extensions and said elevator containing a rudder superimposed into said vertical stabilizer trailing edge, hinged upstream in said vertical stabilizer to form a movable horizontal control about the vertical axis of said aircraft; and (E) a pair of pusher type engines juxtaposed and symetrically attached to the aft end of said fuselage and on each side of said vertical stabilizer with just sufficient clearance to allow safe engine propeller operation.

2. An aircraft, as recited in claim 1, wherein said tall tail fin vertical stabilizer intersecting said monolithic wing horizontal stabilizer reinforced by said auxiliary vertical stabilizers, isolates the propeller air thrust lines of said engins above said aircraft inboard said auxiliary vertical stabilizers across said rudder and said elevator, thereby intensifying thrust attitude control.

3. An aircraft according to claim 2, wherein the propeller air thrust line of said engines are channeled, isolated, and directed above said monolithic wing horizontal stabilizer to exit over the aft end of said elevator and said horizontal stabilizer extensions, thereby reducing plane-to-ground noise.

* * * * *